No. 857,305. PATENTED JUNE 18, 1907.
G. RICHARDS.
BELT PULLEY.
APPLICATION FILED MAY 1, 1906.

2 SHEETS—SHEET 1.

WITNESSES:
Robt R Kitchel
M. M. Hamilton

INVENTOR
George Richards
BY
Harding & Harding
ATTORNEYS.

No. 857,305. PATENTED JUNE 18, 1907.
G. RICHARDS.
BELT PULLEY.
APPLICATION FILED MAY 1, 1906.

2 SHEETS—SHEET 2.

WITNESSES:
Rob't R Ketchel
M. M. Hamilton

INVENTOR
George Richards
BY
Harding & Harding
ATTORNEYS.

UNITED STATES PATENT OFFICE.

GEORGE RICHARDS, OF PHILADELPHIA, PENNSYLVANIA.

BELT-PULLEY.

No. 857,305.            Specification of Letters Patent.          Patented June 18, 1907.

Original application filed August 9, 1905, Serial No. 273,498. Divided and this application filed May 1, 1906. Serial No. 314,633.

*To all whom it may concern:*

Be it known that I, GEORGE RICHARDS, a citizen of the United States, residing at Philadelphia, county of Philadelphia, and State of Pennsylvania, have invented a new and useful Improvement in Belt-Pulleys, of which the following is a full, clear, and exact description, reference being had to the accompanying drawings, which form a part of this specification.

This application is a division of an application filed by me August 9, 1905, Serial No. 273,498.

The invention forming the subject matter of this application relates more particularly to that type of composite metal belt pulley known as a "split" pulley, and especially a pulley which consists of two alining hubs or hub sections, made of steel castings, a series of pairs of arms made from rolled bars of channel section, the two arms of each pair being secured, at their inner ends, to the two hub-sections respectively, and at their outer ends bent oppositely parallel with the pulley-axis; and a rim, bent to a circular shape, to which the outer ends of the arms are attached. The hub sections are each made in two halves, bolted together, and the rim is also made in two halves that are removably clamped together at the two joints.

The object of the invention is to provide a simple and reliable means of securing the arms to the rim at the joints between the abutting ends of the rim sections.

The invention consists of common securing means, hereinafter described, for holding together the abutting ends of the curved plates of which the rim is formed and for attaching the arms to the rim at such abutting ends.

Figure 1:
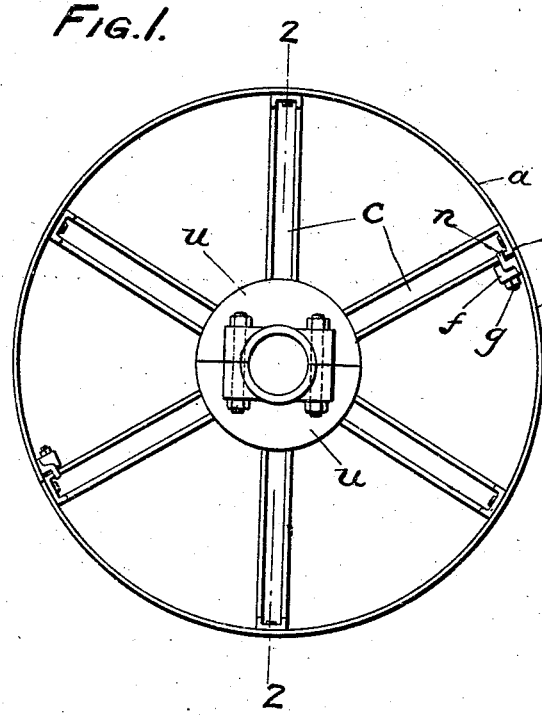
Figure 2:
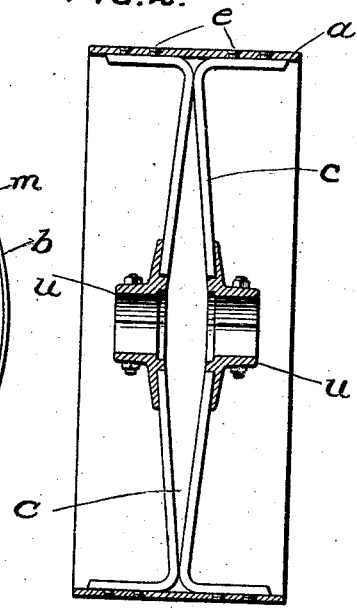
Figure 3:
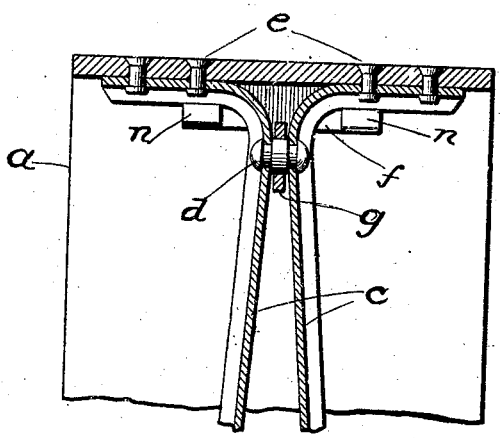
Figure 4:
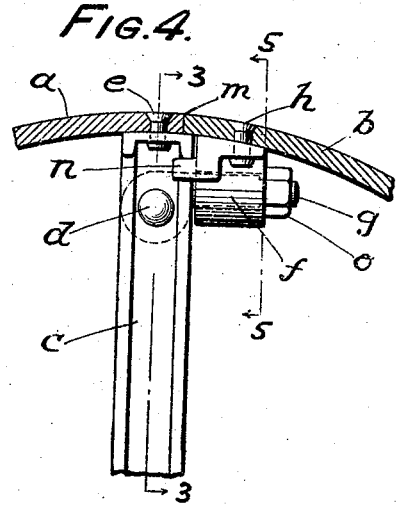
Figure 5:
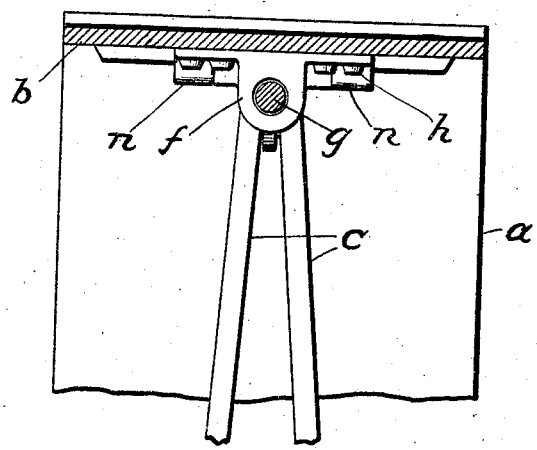
Figure 6:
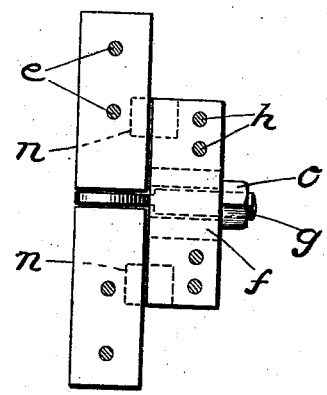
Figure 7:
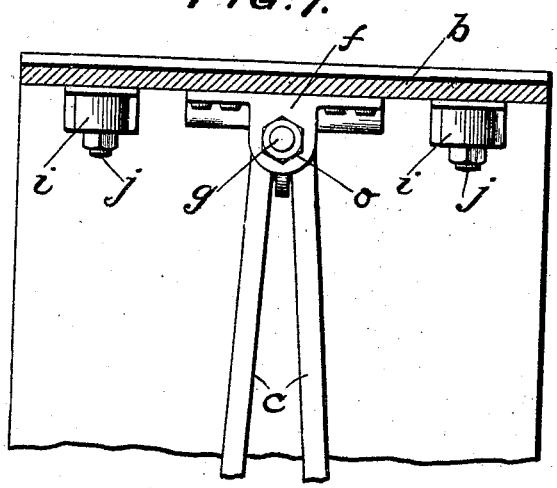
Figure 8:
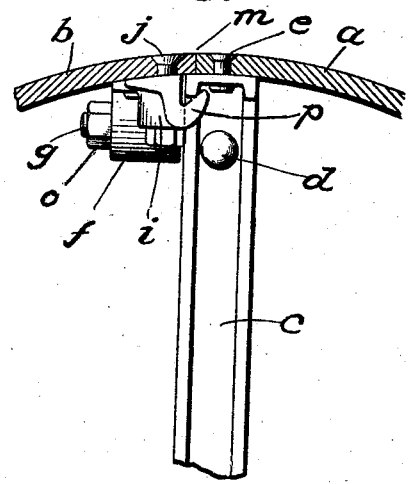
Figure 9:
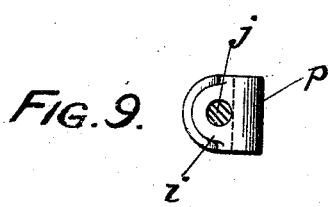

In the drawings: Figure 1 is a side elevation of a split pulley embodying my invention. Fig. 2 is a transverse section through the pulley on the line 2—2 of Fig. 1. Fig. 3 is an enlarged detail sectional view taken on the line 3—3 of Fig. 4 transversely through a part of the pulley and showing the rim, arms, and securing means. Fig. 4 is an enlarged detail sectional view of the parts illustrated in Fig. 3, the section being taken at right angles to that of Fig. 3. Fig. 5 is an enlarged detail sectional view taken on the line 5—5 of Fig. 4. Fig. 6 is a plan view of the clip and ends of the arms as seen if the rim were removed. Fig. 7 is a sectional view similar to Fig. 5 showing a wider rim and the auxiliary clips employed in connection therewith. Fig. 8 is a sectional view taken at right angles to that of Fig 7. Fig. 9 is a transverse sectional view of one of the auxiliary clips.

When a pulley is made in halves, or "split," to enable the pulley to be placed on the shaft without disconnecting the ends of the shafts, it is necessary, especially with a pulley of a size not easily handled, to provide means whereby, quickly and conveniently, the ends of the rims may be pulled together and firmly attached to the arms, so that the ends of the two rim sections may properly abut and aline. For many practical reasons, it is desirable that the rim should be supported at the joints and not between the joints as is generally the practice. The hub sections $u, u$, are made in two pieces bolted together as shown in Fig. 2.

$c, c$, are the pulley arms, each pair of arms being held together near the rim by means of the rivet $d$. The bent outer ends of the arms are secured to the end $a$ of one rim section by means of a row of bolts $e$, on one side of the joint $m$.

$f$ is a metal clip having side members attached to the end $b$ of the other rim section by means of rivets $h$. The side members of the clip have two projections $n$ that rest underneath the adjacent flanges of the arms $c$ and thus prevent any outward movement of the rim section to which the clips are secured. The clip $f$ has a hole through it through which extends the bolt $g$. The bolt $g$ is pivoted on the rivet $d$. By drawing up the nuts $o$ the end $b$ of the rim section to which the clips are secured is brought firmly against the end $a$ of the other rim section and also over the arms $c$, and the projections $n$ are drawn tightly under the arms $c$. The arms $c$ to which one rim section is secured are thus confined between the other rim section and the clip secured thereto. The construction is one admirably adapted to resist the centrifugal and driving strains to which the rim is subjected when in use. With split pulleys having wide rims, additional clips are provided to hold the ends of the rim sections to the arms, and such clips are shown in Figs. 7, 8 and 9. These clips $i$ are secured to the end $b$ of one of the rim sections by means of bolts $j$ riveted to the rim section and extending through holes in the clips.

$p$ are projections having inclined faces extending under the adjacent flanges of the arms $c$. By tightening the bolts $j$, which draw the clips $i$ to the rim section, the projections $p$ will at the same time draw the ends of the rim sections together, thus firmly locking the ends of the rim sections at the joint $m$. In wide pulleys, two or more clips $i$, as may be required, are used on each side of the pulley, in connection with the central clip $f$. In mounting the split pulley on its shaft, the rim sections are first drawn together by the bolts $g$. After the rim sections are in position, the clips $i$ are put on and bolted up tightly.

Having now fully described my invention, what I claim and desire to protect by Letters Patent is:

1. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a clip secured to the rim on the other side of said joint, and a bolt pivoted to said pair of arms and engaging said clip.

2. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a clip secured to the rim on the other side of said joint, and a bolt pivoted to said pair of arms and engaging said clip, projections on the clip underlying respectively the two arms of a pair.

3. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a clip secured to the rim on the other side of said joint, a rivet by which the two arms of a pair are secured together at approximately the point at which the outer ends of the arms diverge, and a bolt pivoted on said rivet and extending through said clip.

4. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a central clip and outside clips secured to the rim on the other side of said joint, the central clip engaging said pairs of arms, and the outside clips engaging respectively the two arms of said pair.

5. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a central clip and outside clips secured to the rim on the other side of said joint, and means by which said arms and clips may be drawn together, thereby enabling the opposing rim ends to be tightly abutted at the joint.

6. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a central clip and outside clips secured to the rim on the other side of said joint, projections on the central clip underlying respectively the two arms of a pair, and projections on the outside clips underlying respectively the said two arms.

7. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a central clip and outside clips secured to the rim on the other side of said joint, projections on the central clip underlying respectively the two arms of a pair, projections on the outside clips underlying respectively said two arms, and means by which said arms and clips may be drawn together.

8. In a composite belt pulley, the combination with the hub, of a rim having a joint, pairs of arms extending from the hub, the outer ends of each pair being bent away from each other toward the pulley edges and underlying and supporting the rim, a pair of said arms extending approximately beneath said joint and secured to the rim on one side of said joint, a central clip secured to the rim on the other side of said joint, projections on the central clip underlying respectively the two arms of a pair, outside clips, projections on the outside clips having upwardly inclined faces underlying respectively said two arms, a bolt engaging said pair of arms and said central clip, and means to support each outside clip on the rim and to draw said clip toward the rim.

9. In a composite belt pulley, the combination with the hub, of a rim having a joint, arms extending from the hub, whose outer ends are bent outwardly toward the rim edge and underlie and support the rim, one of said arms extending approximately beneath said joint and secured to the rim on one side of said joint, a clip, a bolt engaging the clip and the rim on the other side of said joint and permitting the clip to be moved toward the rim, and a projection on the clip having an inclined face engaging the inner side of said arm.

In testimony of which invention, I have hereunto set my hand at London, on this 12 day of April, 1906.

GEORGE RICHARDS.

Witnesses:
 ALFRED NUTTING,
 C. P. LIDDON.